United States Patent [19]
Meyer

[11] Patent Number: 4,967,796
[45] Date of Patent: Nov. 6, 1990

[54] FUEL INJECTION REGULATING VALVE

[75] Inventor: Andrew E. Meyer, Greenwood Lake, N.Y.

[73] Assignee: John Deere Technologies International Inc., Moline, Ill.

[21] Appl. No.: 425,080

[22] Filed: Oct. 23, 1989

[51] Int. Cl.$^5$ .............................................. F16K 11/06
[52] U.S. Cl. ............................... 137/624.15; 123/449; 137/625.17
[58] Field of Search ...................... 137/624.15, 625.17; 123/457, 459, 460, 506, 449

[56] References Cited

U.S. PATENT DOCUMENTS

| | | | |
|---|---|---|---|
| 1,967,851 | 7/1934 | Wilson | 137/624.15 X |
| 2,141,428 | 12/1938 | Carroll | 137/625.17 X |
| 3,894,518 | 7/1975 | Gavrun et al. . | |
| 3,960,115 | 6/1976 | Lamping et al. . | |
| 3,991,723 | 11/1976 | Myers . | |

OTHER PUBLICATIONS

Berman & DeLuca, "Fuel Injection and Controls for Internal Combustion Engines–Mechanical Injection", pp. 18–21, 1962.
Brady, "Diesel Fuel Systems", pp. 100–102, 1981.

*Primary Examiner*—Gerald A. Michalsky

[57] ABSTRACT

A fuel injection control valve has a housing with a high pressure fuel inlet, a fuel outlet and a spill passage. A spool is rotatably and slidably received in the housing. The spool has peripheral delivery and spill control recesses which control communication of fuel to the outlet and through the spill passage as the spool rotates. The width and depth of the recesses may be adjusted to achieve desired timing and flow rate control. The spool is threadably connected to a rotating drive shaft. The spool is movable axially to adjust the amount of fuel delivered for each spool rotation and can be rotated relative to the engine drive system to adjust injection timing.

20 Claims, 2 Drawing Sheets

FUEL INJECTION REGULATING VALVE

BACKGROUND

This invention relates to fuel injection regulating or control valve and more particularly to such a valve with a rotating and axially movable valve member.

One type of known fuel injection system, such as described in U.S. Pat. No. 3,894,518, issued 15 July 1978 to Gavrun et al, includes a cam driven oscillating piston type metering pump. Such systems have high speed limitations because at high speeds the piston may lift off of the driving cam. Also, in multi-unit engines having multiple piston pumps all controlled by a common rack, the failure or seizure of one piston pump can prevent the other piston pumps from being adjusted to a minimum fuel condition. With no shut-off capability, the engine can overspeed and blow up. Furthermore, such piston pumps are expensive and require small clearances to achieve the necessary seal between the piston and the bore within which it oscillates. Finally, the torque required to drive such piston pumps can be substantial and can require appropriately heavy duty gears and/or drive trains.

Another known type of fuel injection system is the high pressure common rail system wherein a high pressure pump supplies a substantially constant high pressure to a manifold and to timing control nozzles. Such systems may require complicated electronics and solenoid activated devices to achieve proper timing of the opening and closing of the nozzle. Also, such nozzles are either on or off and permit very limited control of the flow rate.

SUMMARY

An object of the present invention is to provide a simple and inexpensive fuel injection control valve which is capable of operating at high speeds.

Another object is to provide such a fuel injection control valve which is unlikely to fail in a mode which would cause an engine to overspeed.

Another object is to provide such a fuel injection control valve which does not require fine tolerances.

A further object of the present invention is to provide a fuel injection control valve which can be driven with a low torque input.

Another object of the present invention is to provide a fuel injection control valve which readily permits control of fuel injection timing and flow rate.

These and other objects are achieved by the present invention which has a housing with a high pressure fuel inlet, a fuel outlet and a spill passage. A spool is rotatably and slidably received in the housing. The spool has peripheral delivery and spill control recesses which control communication of fuel to the outlet and through the spill passage as the spool rotates. The width and depth of the recesses may be adjusted to achieve desired timing and flow rate control. The spool is threadably connected to a rotating drive shaft. The spool is movable axially to adjust the timing and amount of fuel delivered for each spool rotation.

BRIEF DESCRIPTION

DETAILED DESCRIPTION

Figure 1:
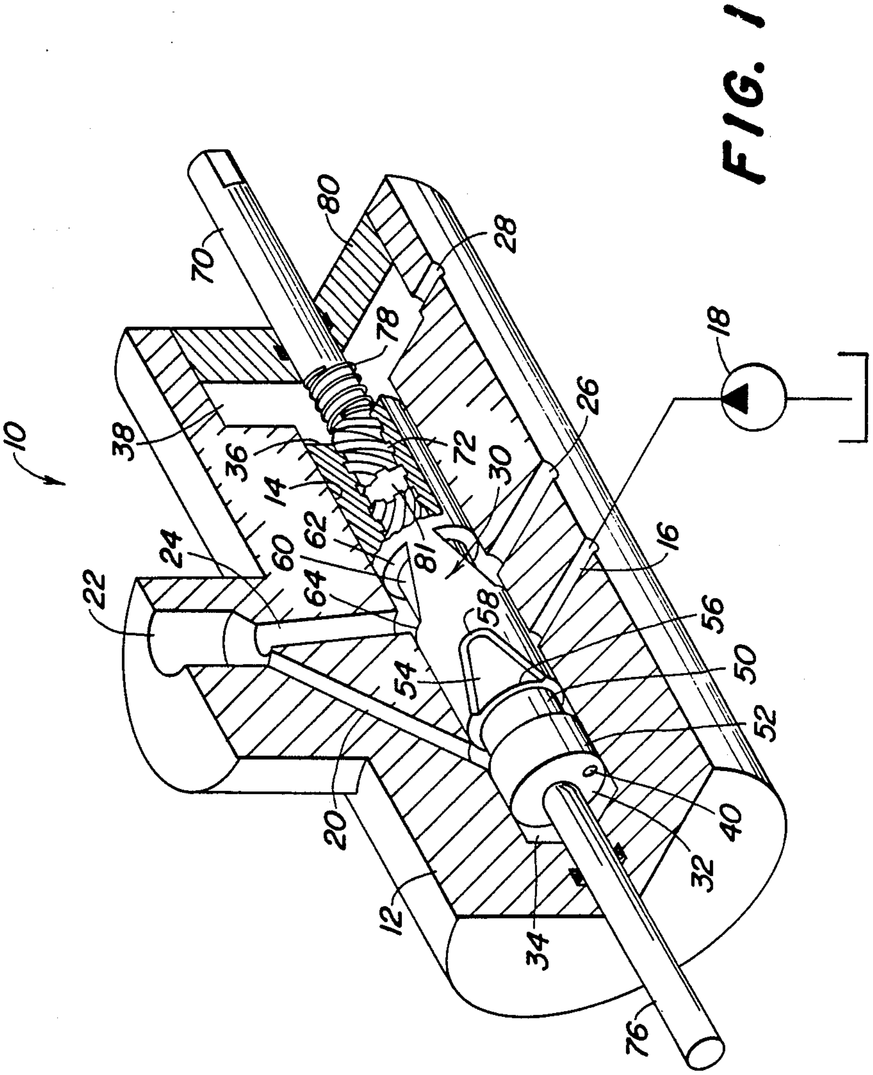
FIG. 1 is an oblique, partial sectional view of a fuel injection control valve according to the present invention.

The fuel regulating or control valve 10 includes a valve housing 12 with a valve bore 14 extending axially therein. An inlet passage 16 extends radially through the housing 12 and communicates the bore 14 with a source of high pressure fuel such as a fuel pump 18. An outlet passage 20 communicates the bore 14 with an outlet port 22 connecting to a convention fuel injector (not shown). A spill passage 24 communicates the outlet port 22 with another portion of the bore 14 and a spill hole 26 communicates the bore 14 to a conventional spill control valve (not shown) which forms no part of the present invention but which would operate to regulate or limit the fuel pressure in the spill hole 26. A timing or pressure port 28 communicates the bore 14 to pressure regulating valve (not shown) which again forms no part of the present invention, but which could be used to control the fuel pressure communicated to the pressure port 28.

Figure 2:
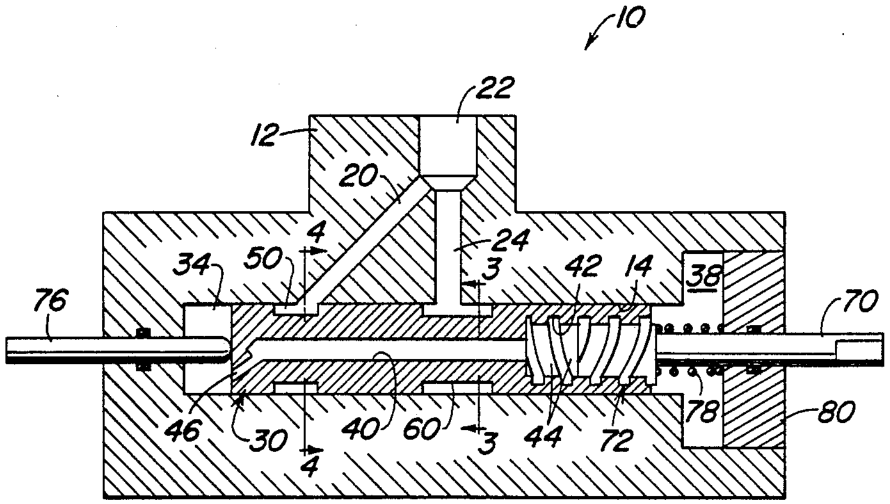
FIG. 2 is a sectional side view of the fuel injection control valve of the present invention.

A valve spool 30 is slidably and rotatably received in the bore 14. The spool 30 has a first end 32 which cooperates with a wall of the bore 14 to define a damping chamber 34. The opposite end 36 of the spool defines a pressure or timing chamber 38 which is communicated with port 28. As best seen in FIG. 2, a bore 40 extends axially into the center of the spool 30. Bore 40 has a large diameter end portion 42 which is internally threaded with helical ridges 44 and which opens to the chamber 38. A damping orifice 46 communicates the other end of bore 40 with the damping chamber 34.

The spool 30 has an annular groove 50 separated from end 32 by land 52 and communicated with outlet passage 20. A delivery recess 54 is formed in the periphery of spool 30 and extends generally axially into spool 30 and away from land 52. Recess 54 has a wide end 56 which intersects or communicates with groove 50 and recess 54 tapers away from groove 50 to a narrow end 58.

Figure 3:
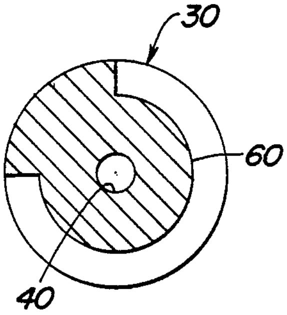
FIG. 3 is a sectional view along lines 3—3 of FIG. 2.
Figure 4:
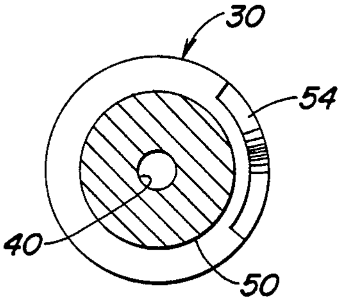
FIG. 4 is a sectional view along lines 4—4 of FIG. 2.

The spool 30 also has a spill control recess 60 which is spaced axially apart from recess 54. Recess 60 has a wider end 62 and tapers towards groove 50 to a narrow end 64. As best seen in FIGS. 1, 3 and 4, the recess 60 extends peripherally substantially more than half way around the spool 30, while the delivery recess 54 extends less than one quarter around the periphery of the spool 30. The recesses 54 and 60 are dimensioned and oriented with respect to each other and with respect to the inlet port 16 and the spill port 26 so that whenever recess 54 is in communication with inlet port 16, communication between spill port 26 and recess 60 will be closed and vice versa. In this way, as the spool 30 rotates high pressure fuel is communicated when desired to outlet 22 via inlet port !6, recess 54, groove 50 and outlet passage 20, and lower regulated pressure is communicated when desired to outlet 22 via spill port 26, recess 60 and spill passage 24. The depth of recess 54 may be varied across the circumference of the spool 30 to achieve a variable fuel flow rate, as opposed to a purely on-off control.

A rotating drive shaft 70 extends into an end of the housing, through chamber 38 to a helically threaded end part 72 which is threadably, rotatably and slidably received by bore portion 42 of the spool 30. A control rod 76 is slidably received by he other end of the housing 12 and engages the end 32 of the spool. A helical spring 78 is mounted on the shaft 70 in chamber 38 between shaft part 72 and housing end wall 80. Spring 78 engages the end wall 80 and an annular end surface of part 72, and is biased to urge end part 72 and spool 30 towards control rod 74 and away from end wall 80.

Mode of Operation

The valve 10 is operated by rotating the shaft 70 in dependence upon rotation speed of the engine (not shown) with which it operates. In the case of a convention rotary engine, the shaft 70 would be rotated at the same speed as the rotary engine drive shaft (not shown). However, it would operate if rotated at different speeds if the number and size of the recesses 54 and 60 were adjusted accordingly. The present invention would also operate in connection with a conventional Diesel engine if the spool rotation speed and the recess size and spacing were appropriately adjusted. The rotating shaft 70 in turn rotates the spool 30 so that during a portion of each revolution of the spool 30, the delivery recess will communicate high pressure fuel to the outlet 22 and during another portion of each revolution, the spill recess will communicate the outlet 22 to the spill port 26. Additional control is provided by moving the control rod 74 to the right viewing FIG. 1 and 2. This will cause the rotating spool 30 to shift axially to the right, thus causing the inlet port 16 to intersect a wider portion of delivery recess 54 and causing spill port 26 to intersect a narrower port of spill recess 60. This causes the valve 10 to deliver more fuel to the outlet 22 per revolution of spool 30. Conversely, movement of the rod 74 to the left will cause the valve 10 to deliver less fuel per revolution of spool 30 as the spool 30 shifts to the left under the influence of spring 76. The timing of fuel delivered to the engine can be varied by controlling the pressure in chamber 38. This pressure is communicated to chamber 81 through the clearances in the spline 72, causing shaft 70 and spline 72 to move outwardly axially against spring 78. Spool 30 is rotated by spline 72 relative to driveshaft 70, thus advancing the timing of fuel injection relative to the engine. While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed:

1. A fuel injection control valve for an engine, comprising:
   - a housing having a valve bore therein, an inlet port for communicating the bore with a source of pressurized fuel, an outlet port for communicating the bore with an engine fuel injector, a spill passage communicating the bore with the outlet, and a spill port for communicating the valve bore with a regulated source of spill fuel pressure;
   - a spool rotatably and slidably received in the valve bore, the spool having an annular groove communicated with the outlet port, a delivery recess on a surface of the spool, the delivery recess being communicated with the groove, a spill recess on the surface of the spool spaced apart from the delivery recess;
   - means for rotating the spool, the spool having a first set of rotary positions wherein communication between the inlet port and the delivery recess is blocked and wherein the spill recess communicates the spill passage to the spill port, and the spool having a second set of rotary positions wherein the inlet port is communicated with the outlet port via the delivery recess and the groove and wherein communication between the spill port and the spill passage is blocked; and
   - means for moving the spool axially to adjust the amount of fuel communicated from the inlet port to the delivery recess and, from the spill passage to the spill port for each rotation of the spool.

2. The fuel injection control valve of claim 1, wherein:
   - the delivery recess tapers axially from a wider end to a narrower end; and
   - a control member engages the spool to move the spool axially so that the varying width of the delivery slot adjusts the amount of fuel communicated from the inlet port to the outlet during each revolution of the spool.

3. The invention of claim 2, further comprising:
   - a resilient member engaging the valve housing and biased to urge the spool towards the control member.

4. The invention of claim 3, wherein:
   - the resilient member rotatably and slidably receives a portion of the spool rotating means, one end of the resilient member engaging the housing and the other end of the resilient member engaging the spool rotating means.

5. The invention of claim 3, wherein:
   - the means for rotating comprises a shaft rotatably and slidably received by an end of the housing, the shaft having a threaded end portion; and
   - the spool has an internally threaded axial bore therein which slidably and rotatably receives the shaft end portion, movement of the control member towards the resilient member axially moving the spool and the shaft relative to the housing and compressing the resilient member.

6. The fuel injection control valve of claim 1, wherein:
   - the spill recess tapers axially from a wider end to a narrower end; and
   - a control member engages the spool to move the spool axially so that the varying width of the spill slot adjusts the amount of fuel communicated from the outlet port to the spill port during each revolution of the spool.

7. The invention of claim 6, further comprising:
   - a resilient member engaging the valve housing and biased to urge the spool towards the control member.

8. The invention of claim 7, wherein:
   - the means for rotating comprises a shaft rotatably and slidably received by an end of the housing, the shaft having a threaded end portion; and
   - the spool has an internally threaded axial bore therein which slidably and rotatably receives the shaft end portion, movement of the control member towards the resilient member axially moving the spool and the shaft relative to the housing and compressing the resilient member.

9. The invention of claim 1, wherein:

the means for rotating comprises a shaft rotatably received by an end of the housing, the shaft having a threaded end portion; and the spool has an internally threaded axial bore therein which slidably and rotatably receives the shaft end portion.

10. The invention of claim 1, wherein:

a first end of the spool cooperates with a wall of the valve bore to define a damping chamber and a second end of the spool cooperate with a wall of the bore to define a pressure chamber;

the valve housing having a pressure port therein for communicating the pressure chamber with a controlled source of pressure;

the spool comprising a blind central bore extending into the spool from the second end, the blind bore being communicated with the pressure chamber at the second end of the spool; and the spool further comprising a damping orifice extending from the blind bore to the first end of the spool and communicating the damping chamber with the blind bore.

11. A fuel delivery control valve comprising:

a valve housing having a high pressure fuel inlet, a fuel outlet, a spill outlet and a spill passage for communicating fuel from the fuel outlet to the spill outlet;

a valve member slidably and rotatably mounted in the housing, the valve member comprising means for controlling communication between the inlet and the outlet and for controlling communication of fuel through the spill passage as a function of rotation and axial movement of the valve member;

a rotatable input shaft extending through the housing;

means for coupling the input shaft to one end of the valve member so that the valve member is axially movable with respect to the input shaft and so that the valve member is rotatable with and with respect to the input shaft;

a slidable input rod extending through the housing; and means for coupling the input rod to another end of the valve member so that movement of the rod causes only axial movement of the valve member.

12. The valve of claim 11, wherein:

the housing and the valve member cooperate to enclose a pressure chamber, the valve member being movable axially in response to pressure changes in the pressure chamber.

13. The valve o claim 12, wherein:

the housing and the valve member enclose a damping chamber; and

14. The valve of claim 13, wherein:

the damping orifice extends through the valve member.

15. The valve of claim 11, wherein:

an end of the valve member is hollow, the hollow end receiving a portion of the input shaft.

16. The valve of claim 11, wherein:

a resilient member is received by the housing and is biased to urge the valve member towards the input rod.

17. The valve of claim 11, Wherein the means for controlling communication comprises:

a delivery recess on a surface of the valve member.

18. The valve of claim 17, wherein:

the delivery recess has a dimension which varies along a direction parallel to a central axis of the valve member.

19. The valve of claim 18, wherein:

the delivery recess comprises an annular groove in the surface of the valve member, the groove being communicated with the fuel outlet; and a depression in the surface of the valve member, the depression being connected to the groove, and the valve member being rotatable to a first position wherein the depression is communicated with the fuel inlet and a second position wherein communication between the depression and fuel inlet is blocked.

20. The valve of claim 19, wherein:

the depression has a wider end connected to the groove and extends away from the groove to a narrower end.

* * * * *

UNITED STATES PATENT AND TRADEMARK OFFICE
CERTIFICATE OF CORRECTION

PATENT NO. : 4,967,796

DATED : 6 November 1990

INVENTOR(S) : Andrew E. Meyer

It is certified that error appears in the above-identified patent and that said Letters Patent is hereby corrected as shown below:

In Col. 6, line 9, delete "o" and insert -- of --.

In Col. 6, line 11, after " ;and " insert -- a damping orifice communicates the damping chamber with the pressure chamber.

In Col. 6, line 22, delete "Wherein" and insert -- wherein --.

Signed and Sealed this

Fourth Day of August, 1992

*Attest:*

DOUGLAS B. COMER

*Attesting Officer*

*Acting Commissioner of Patents and Trademarks*